June 16, 1953  J L. STEPHANS  2,642,246
ADJUSTABLE SUPPORT STAND
Filed Sept. 27, 1949
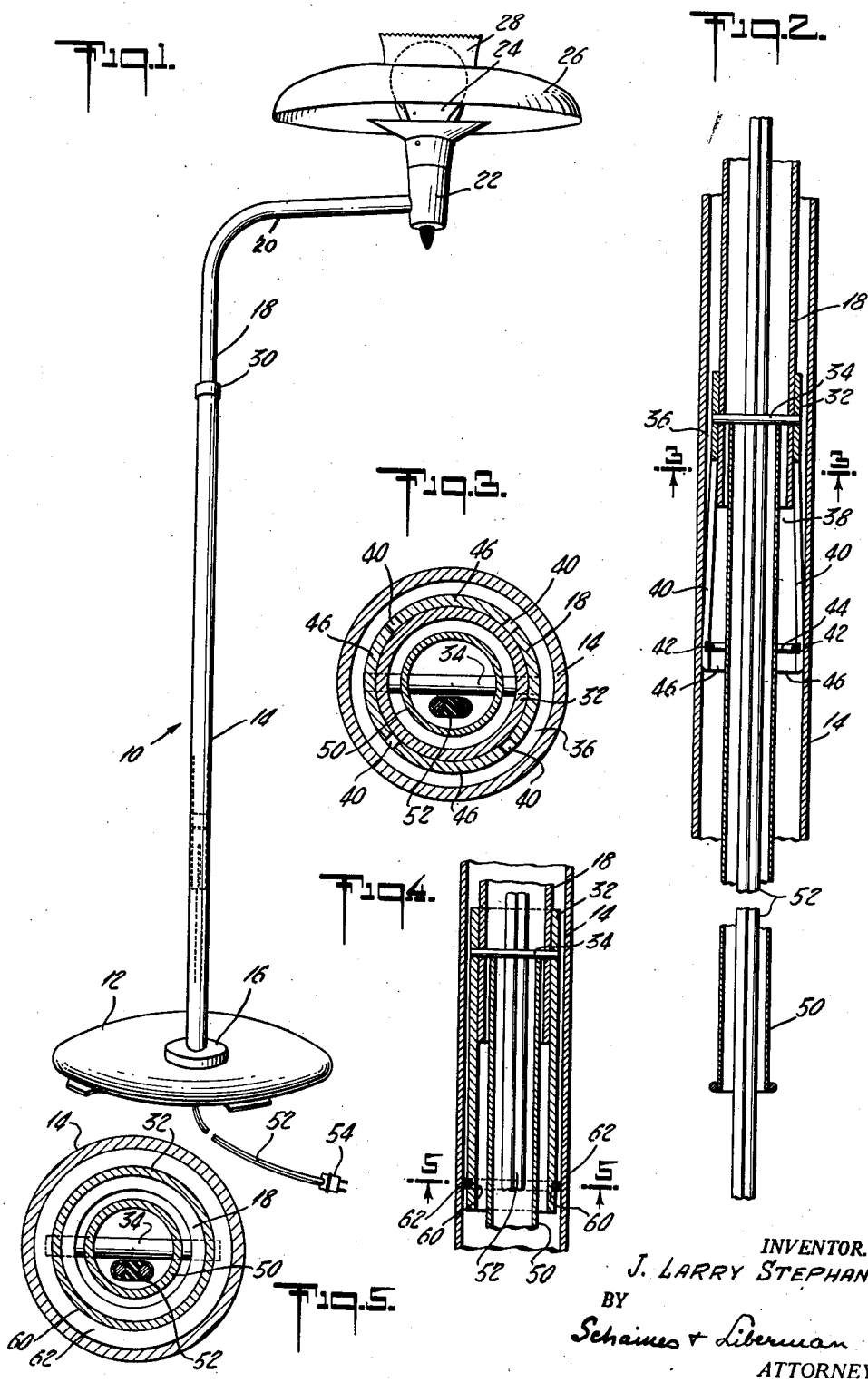
INVENTOR.
J. LARRY STEPHANS
BY
Schaines & Liberman
ATTORNEYS Patented June 16, 1953

2,642,246

UNITED STATES PATENT OFFICE 2,642,246

ADJUSTABLE SUPPORT STAND

J Larry Stephans, St. Albans, N. Y., assignor, by mesne assignments, to International Projector Corporation, Bloomfield, N. J., a corporation of Delaware Application September 27, 1949, Serial No. 118,157

4 Claims. (Cl. 248—161)

The present invention relates generally to the field of illumination and in particular it relates to supports for lighting fixtures. Even more specifically, the present invention relates to adjustable telescoping supports for lighting fixtures whereby the height of the light source may be adjusted to any desired level.

Set screw arrangements for such purpose are well known in the field, as are screw collars and the like, but these expedients are unsightly or involve manufacturing and assembly problems, and are difficult to handle for users who are not mechanically inclined.

The main object of the present invention is the provision of a telescoping support for light fixtures having automatically operable friction means disposed within the outer component of the assembly for adjustably holding the telescoping members in any desired relative position.

Another object of the present invention is the provision of a telescoping support for a light fixture, wherein the fixture is fixed atop the inner component, and automatically operable friction means are provided on the bottom of the inner component whereby to adjustably locate the inner component with respect to the outer socket component.

Other and associated objects of the present invention relate to the nature of the friction means, and will in part be obvious and in part specifically pointed out in connection with the following description of several illustrative embodiments.

In the drawings annexed hereto, and forming a part hereof,

Figure 1 is a side elevational view of one form of device constructed according to and embodying the present invention;

Figure 2 is a vertical section through a portion of the telescoping members illustrating one form of friction lock according to the present invention;

Figure 3 is a section on the line 3—3 of Figure 2;

Figure 4 is a vertical section through a portion of the telescoping members illustrating another form of friction lock according to the present invention; and Figure 5 is a section on the line 5—5 of Figure 4.

The device is indicated generally by reference numeral 10, and includes a wide base member 12 and a tube 14 comprising the outer telescoping component of the assembly. A suitable locknut as 16 may be provided at the bottom of tube 14 to secure same atop base 12, or the tube may be secured by other means, as desired or convenient. The inner component 18 of the assembly comprises a hollow tube of smaller diameter than tube 14, the lower end of tube 18 being disposed within tube 14. The upper reach of tube 18 may be bent or angled, as desired, as indicated at 20, to support the socket 22, atop which the light bulb 24, reflector 26 and gallery 28 is mounted, as shown.

It is to be understood that any desired type of light fixture or assembly may be used within the scope of the present invention, subject to one limitation which will be referred to below.

A ferrule or collar ring 30 is secured atop main tube 14 to maintain extension tube 18 in alignment therewith, and to prevent accidental withdrawal of the tube from the staff.

A elongated tubular collar 32, of suitable fibrous material, is provided, and is disposed about tube 18 adjacent the bottom end thereof, and fixed thereto by means of a pin 34 passing horizontally through registering apertures in the tube 18 and the tubular collar, a substantial length of the tubular collar depending below the end of tube 18. As seen in Figures 2 and 3, tubular collar 32 fits closely about tube 18, but the outer diameter of collar 32 is less than the inside diameter of tube 14, leaving some little clearance between them as indicated at 36. The greater length 38 of tubular collar 32 upwardly from the bottom thereof is longitudinally slitted, as at 40, and is transversely grooved or channeled on the inner surface thereof, as at 42, adjacent the lower end thereof. A split spring ring 44 normally biased to expand, is trapped within groove 42, presses the fingers 46, 46 of collar 32 (formed by slitting 40, 40) outwardly and against the inner surface of tube 14. This spring pressure causes fingers 46, 46 to friction lock tube 18 inside tube 14 at any desired relative position, and all that is required to change the relative positions is to grasp tube 18 and shift it upwardly or downwardly as desired. The expansible force of spring ring 44 will be sufficient to cause fingers 46, 46 to hold against tube 14, yet will easily permit longitudinal shifting at right angles to the direction of spring expansion.

The weight of the light fixture assembly must be less than that supportable by the friction grip of tubular collar 32 against female staff 14. Spring strength may be varied as needed for any particular installation by inserting stronger springs, as will be readily understood.

A safety tube 50 is disposed inside staff 14, of such small diameter as to fit inside extension tube 18. Tube 50 rests freely atop base 12 and its length defines the low position of extension tube 18 inside staff 14, since pin 34 adjacent the bottom of tube 18 will bear against the top of tube 50, as seen in Figure 2. The electric cord 52 is threaded through a suitable aperture in base 12, up safety tube 50 within tube 14, past pin 34, through extension tube 18, and into the assembly at 22. Safety tube 50 functions to prevent kinking or twisting of cord 52 from the plug end 54 thereof inside the support structure.

In the modification of the invention illustrated in Figures 4 and 5, wherein parts similar to those in the other figures are given similar reference numerals, the friction gripping of extension tube 18, via tubular collar 32, against the inner wall of tube 14, is achieved by a change in fiber tubular collar 32. In this modification, tubular collar 32 is not vertically slitted, as in the form of Figures 2 and 3, but is annularly grooved on the outer surface, adjacent the lower edge, as at 60. Split spring ring 62 is trapped within groove 60, exerting its expansile pressure directly against the inside of staff 14, and operating also to retain tube 18 within tube 14 at any desired relative position, as permitted by safety tube 50.

In both forms of the present invention, a trapped split spring ring exerts sufficient expansile force directed horizontally, because of its location in grooves 42, 60, to releasably hold the weight of extension tube 18 and the lamp assembly in any desired position. In the form of Figures 2 and 3, the fibrous material of collar takes the wear against tube 14, while in the form of Figures 4 and 5 the spring ring 62 takes the wear.

Having now described my invention, what I claim and desire to secure by Letters Patent is:

1. A vertically adjustable support structure for electric lamps comprising an apertured base member, an elongated tube secured to the base and projecting upwardly therefrom, a second elongated tube of lesser diameter than the first tube telescopically and slidably disposed therein, a collar secured to the second tube adjacent the bottom thereof and extending downwardly therefrom, an annular horizontal groove in the collar below the bottom of the second tube, an expansion spring ring disposed in the groove and exerting horizontally directed outward pressure against the inner surface of the first tube whereby to hold the second tube within the first tube in any desired relative position, the second tube being vertically slidable within the first tube against the normal biasing of the spring ring, a third tube of smaller diameter than the second tube and extending upwardly from the base to accommodate current supply wires, and a stop carried by the lower end of the second tube and against which the upper end of the third tube abuts to limit the lowering of the second tube.

2. A vertically adjustable support structure for electric light fixtures comprising a base member and an elongated tube secured thereon extending vertically upwards therefrom, a second tube disposed within the first tube and vertically reciprocable therein, a ferrule fixed atop the first tube and encircling the second tube, means to limit the extent of upward and means to limit the extent of downward movement of the second tube within the first tube, a collar disposed about the second tube adjacent the bottom thereof, and a pin extending transversely through the collar and second tube to secure same together, a third tube, shorter than the first and disposed therewithin, the diameter of the third tube being smaller than that of the first and second tubes, an opening in the base forming a conduit for electric wiring up through the base, into and through the first and third tubes, past the pin, and through the second tube into the free end thereof remote from the base, the abutment of the pin against the top of the third tube operating to limit downward movement of the second tube within the first tube, the ferrule about the top of the first tube operating to limit upward movement of the second tube out of the first tube.

3. A vertically adjustable support structure for electric lamps comprising a centrally apertured base member, an elongated tube secured to the base in registry with the aperture therein, the tube projecting upwardly from the base, a second elongated tube of substantially lesser diameter than the first tube and telescopically and slidably disposed therein, a collar comprising a third tube, substantially shorter than the first two tubes, of greater diameter than the second tube and of lesser diameter than the first tube secured to and depending from the bottom of the second tube, a fourth elongated tube, shorter than the first two tubes, longer than the third tube and of lesser diameter than the first three tubes, said fourth tube being disposed inside the first tube and trapped between the base and the point of securement of the third tube to the second tube, an annular horizontal groove in the third tube spaced from the bottom of the second tube, an expansion spring ring disposed in the groove and exerting horizontally directed outward pressure against the inner surface of the first tube, whereby to releasably retain the second and third tubes within the first tube and above the fourth tube in any desired relative position, said second and third tubes being vertically and reciprocably slidable within the first tube against the normal biasing of the spring ring, the four tubes being of substantially uniform diameter throughout their length and concentrically arranged.

4. A support structure as in claim 3, in which the first tube has a ferrule fixed at the top thereof loosely encircling the second tube, the top of the fourth tube limiting the downward movement of the second and third tubes into the first tube, and the third tube abutting against the underside of the ferrule fixed atop the first tube to limit the extent of upward movement of the second and third tubes out of the first tube.

J LARRY STEPHANS.

References Cited in the file of this patent

UNITED STATES PATENTS

| Number | Name | Date |
|---|---|---|
| 1,511,630 | Ozlek | Oct. 14, 1924 |
| 1,769,004 | Turse | July 1, 1930 |
| 2,409,867 | Jones | Oct. 22, 1946 |

FOREIGN PATENTS

| Number | Country | Date |
|---|---|---|
| 563,654 | Germany | Nov. 8, 1932 |